US009779767B2

(12) United States Patent
Biskeborn et al.

(10) Patent No.: US 9,779,767 B2
(45) Date of Patent: Oct. 3, 2017

(54) MAGNETIC READ HEAD HAVING A CPP MR SENSOR ELECTRICALLY ISOLATED FROM A TOP SHIELD

(71) Applicant: International Business Machines Corporation, Armonk, NY (US)

(72) Inventors: Robert G. Biskeborn, Hollister, CA (US); Robert E. Fontana, Jr., San Jose, CA (US); Jason Liang, Campbell, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/996,061

(22) Filed: Jan. 14, 2016

(65) Prior Publication Data

US 2016/0133282 A1    May 12, 2016

Related U.S. Application Data

(63) Continuation of application No. 14/534,098, filed on Nov. 5, 2014, now Pat. No. 9,263,068.

(51) Int. Cl.
*G11B 5/39* (2006.01)
*G11B 5/29* (2006.01)
*G11B 5/008* (2006.01)

(52) U.S. Cl.
CPC ........ *G11B 5/3912* (2013.01); *G11B 5/00813* (2013.01); *G11B 5/00826* (2013.01); *G11B 5/29* (2013.01); *G11B 5/3909* (2013.01); *G11B 5/3977* (2013.01)

(58) Field of Classification Search
None
See application file for complete search history.

(56) References Cited

U.S. PATENT DOCUMENTS

| 5,668,688 A | 9/1997 | Dykes et al. |
| 5,862,022 A | 1/1999 | Noguchi et al. |
| 5,898,547 A | 4/1999 | Fontana, Jr. et al. |
| 5,898,548 A | 4/1999 | Dill et al. |
| | (Continued) | |

FOREIGN PATENT DOCUMENTS

JP    2006134388 A    5/2006

OTHER PUBLICATIONS

Non-Final Office Action from U.S. Appl. No. 14/534,098, dated Apr. 3, 2015.
(Continued)

*Primary Examiner* — Will J Klimowicz
(74) *Attorney, Agent, or Firm* — Zilka-Kotab, P.C.

(57) ABSTRACT

An apparatus according to one embodiment includes a transducer structure having: a lower shield, an upper shield above the lower shield, a current-perpendicular-to-plane sensor between the upper and lower shields, and an insulating layer between the at least one lead and the shield closest thereto. At least one lead is selected from a group including: an upper electrical lead between the sensor and the upper shield and a lower electrical lead between the sensor and the lower shield. The at least one lead is in electrical communication with the sensor. A width of one or more of the at least one lead in a cross track direction is about equal to a width of the sensor.

18 Claims, 11 Drawing Sheets

(56) References Cited

U.S. PATENT DOCUMENTS

| | | |
|---|---|---|
| 6,185,080 B1 | 2/2001 | Gill |
| 6,198,609 B1 | 3/2001 | Barr et al. |
| 6,209,193 B1 | 4/2001 | Hsiao |
| 6,353,518 B2 | 3/2002 | Pinarbasi |
| 6,680,832 B2 | 1/2004 | Fontana, Jr. et al. |
| 6,735,059 B2 | 5/2004 | Sato |
| 6,762,912 B2 | 7/2004 | Ma |
| 6,847,509 B2 | 1/2005 | Yoshikawa et al. |
| 6,980,403 B2 | 12/2005 | Hasegawa |
| 7,031,119 B2 | 4/2006 | Watanabe et al. |
| 7,057,864 B2 | 6/2006 | Gill |
| 7,280,321 B2 | 10/2007 | Watanabe et al. |
| 7,352,539 B2 | 4/2008 | Sato et al. |
| 7,382,589 B2 | 6/2008 | Lin et al. |
| 7,551,409 B2 | 6/2009 | Carey et al. |
| 7,715,156 B2 | 5/2010 | Hirata et al. |
| 7,933,100 B2 | 4/2011 | Nakabayashi et al. |
| 8,335,056 B2 | 12/2012 | Balamane et al. |
| 8,576,518 B1 | 11/2013 | Zeltser et al. |
| 8,804,287 B2 | 8/2014 | Araki et al. |
| 9,263,068 B1 * | 2/2016 | Biskeborn ............ G11B 5/3912 |
| 2004/0057162 A1 | 3/2004 | Gill |
| 2004/0218313 A1 | 11/2004 | Suda |
| 2007/0047146 A1 | 3/2007 | Biskeborn et al. |
| 2008/0151438 A1 | 6/2008 | Tanaka et al. |
| 2009/0027812 A1 * | 1/2009 | Noguchi ............ G11B 5/00826 360/324.11 |
| 2009/0040661 A1 | 2/2009 | Tanaka et al. |
| 2009/0109580 A1 * | 4/2009 | Ayukawa ............... B82Y 10/00 360/324.12 |
| 2011/0051291 A1 | 3/2011 | Miyauchi et al. |
| 2011/0085261 A1 | 4/2011 | Ito et al. |
| 2012/0063034 A1 | 3/2012 | Hsu et al. |
| 2014/0022668 A1 | 1/2014 | Takagishi et al. |

OTHER PUBLICATIONS

Biskeborn et al., U.S. Appl. No. 14/591,861, filed Jan. 7, 2015.
Biskeborn et al., U.S. Appl. No. 14/534,098, filed Nov. 5, 2014.
Non-Final Office Action from U.S. Appl. No. 14/591,861, dated Jul. 28, 2015.
Final Office Action from U.S. Appl. No. 14/534,098, dated Aug. 5, 2015.
Notice of Allowance from U.S. Appl. No. 14/534,098, dated Oct. 15, 2015.

* cited by examiner

MAGNETIC READ HEAD HAVING A CPP MR SENSOR ELECTRICALLY ISOLATED FROM A TOP SHIELD

BACKGROUND

The present invention relates to data storage systems, and more particularly, this invention relates to magnetic heads such as tape heads implementing current-perpendicular-to-plane (CPP) magnetoresistive (MR) sensors that are electrically isolated from top shields of the tape heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a transducer structure having: a lower shield, an upper shield above the lower shield, a current-perpendicular-to-plane sensor between the upper and lower shields, and an insulating layer between the at least one lead and the shield closest thereto. At least one lead may include an upper electrical lead between the sensor and the upper shield, a lower electrical lead between the sensor and the lower shield, or both. The at least one lead is in electrical communication with the sensor. A width of one or more of the at least one lead in a cross track direction is about equal to a width of the sensor.

An apparatus according to another embodiment includes a transducer structure having: a lower shield, an upper shield above the lower shield, a current-perpendicular-to-plane sensor between the upper and lower shields, an upper electrical lead between the sensor and the upper shield, and an insulating layer between at upper electrical lead and the upper shield. The upper electrical lead is in electrical communication with the sensor. A width of the upper electrical lead in a cross track direction is about equal to a width of the sensor.

A method of forming a transducer structure according to yet another embodiment includes forming a lower shield, forming a current-perpendicular-to-plane sensor above the lower shield, forming an upper electrical lead above the sensor, forming an insulating layer above the upper electrical lead; and forming an upper shield above the insulating layer. The upper electrical lead is in electrical communication with the sensor. A width of the upper electrical lead in a cross track direction is about equal to a width of the sensor.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having one or more heads which implement CPP MR sensors that are electrically isolated from respective top shields of the heads. It follows that various embodiments described herein reduce the probability of sensor shorting, as will be described in further detail below.

In one general embodiment, an apparatus includes a transducer structure having: a lower shield; an upper shield above the lower shield, the shields providing magnetic shielding; a current-perpendicular-to-plane sensor between the upper and lower shields; at least one of an upper electrical lead between the sensor and the upper shield and a lower electrical lead between the sensor and the lower shield, the at least one lead being in electrical communication with the sensor; and an insulating layer between the at least one of the leads and the shield closest thereto.

In another general embodiment, an apparatus includes a transducer structure having: a lower shield; an upper shield above the lower shield; a current-perpendicular-to-plane sensor between the upper and lower shields; an upper electrical lead between the sensor and the upper shield, the upper electrical lead being in electrical communication with the sensor; and an insulating layer between at upper electrical lead and the upper shield.

In yet another general embodiment, a method of forming a transducer structure includes forming a lower shield; forming a current-perpendicular-to-plane sensor above the lower shield; forming an upper electrical lead above the sensor, the upper electrical lead being in electrical communication with the sensor; forming an insulating layer above the upper electrical lead; and forming an upper shield above the insulating layer.

Figure 1A:
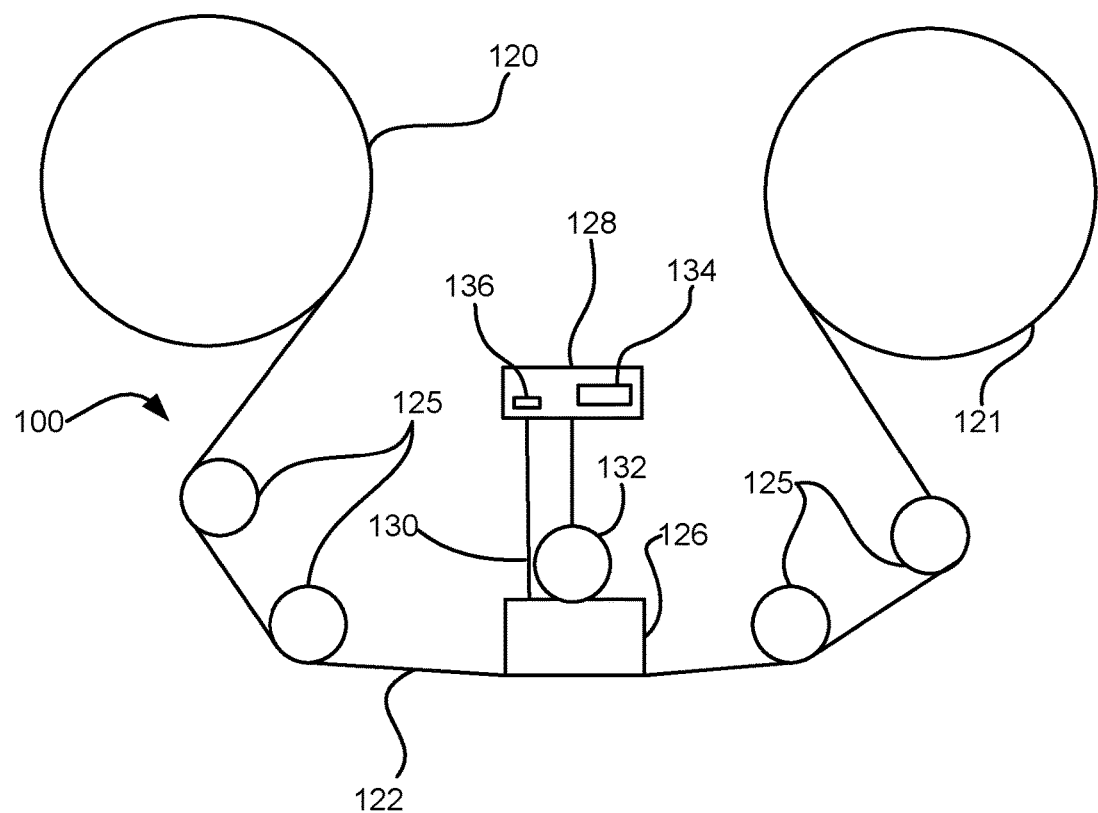
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or other logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
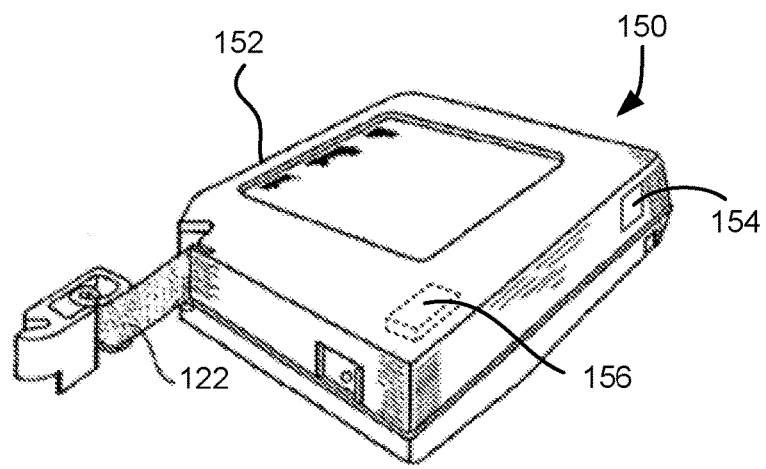
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
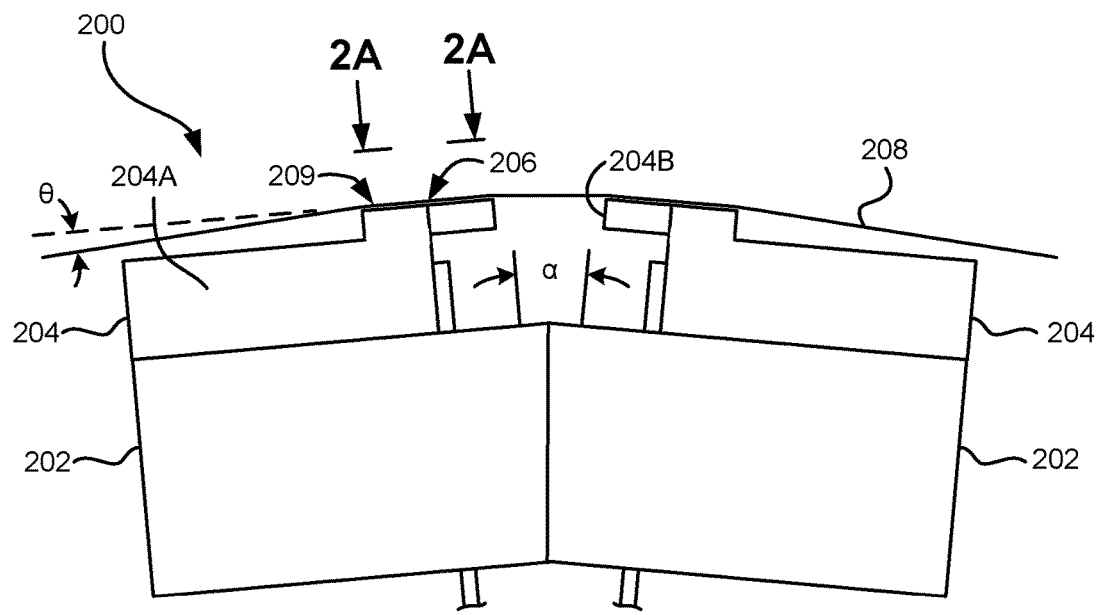
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
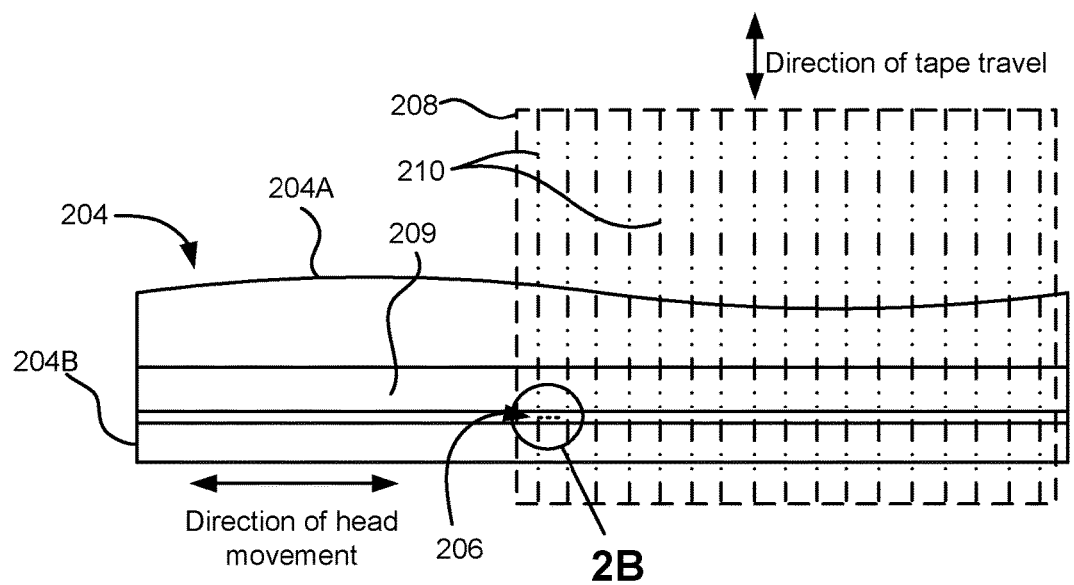
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
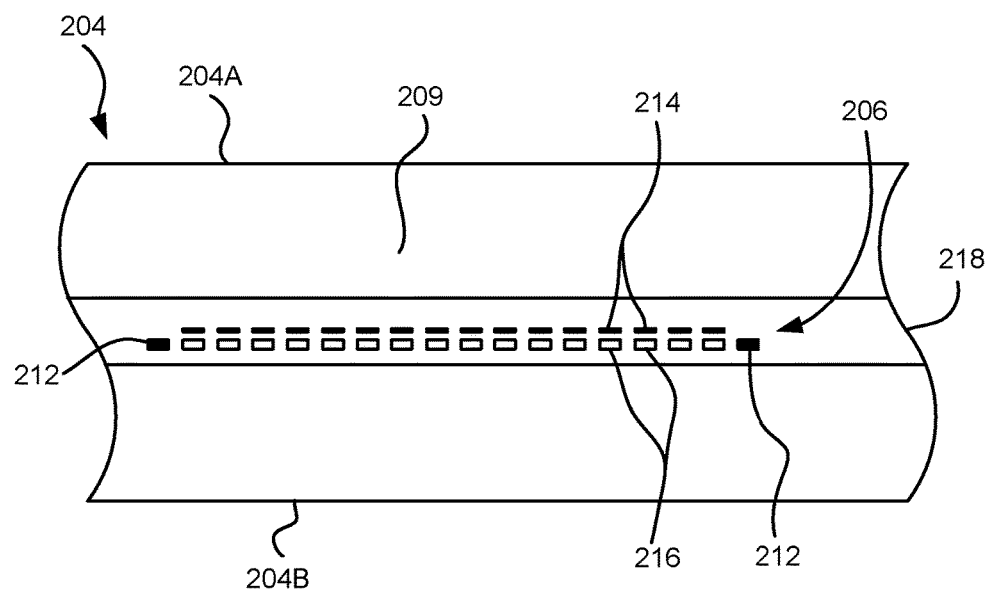
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
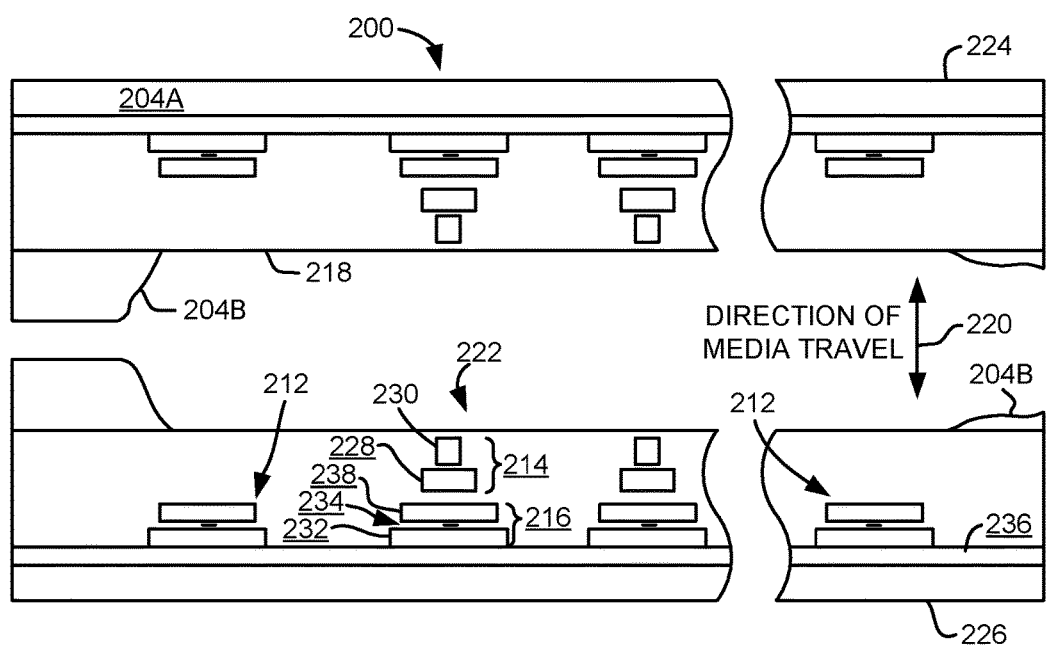
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type of CPP sensor, including those based on magnetorisistive (MR), giant magnetorisistive (GMR), tunneling magnetoresistive (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
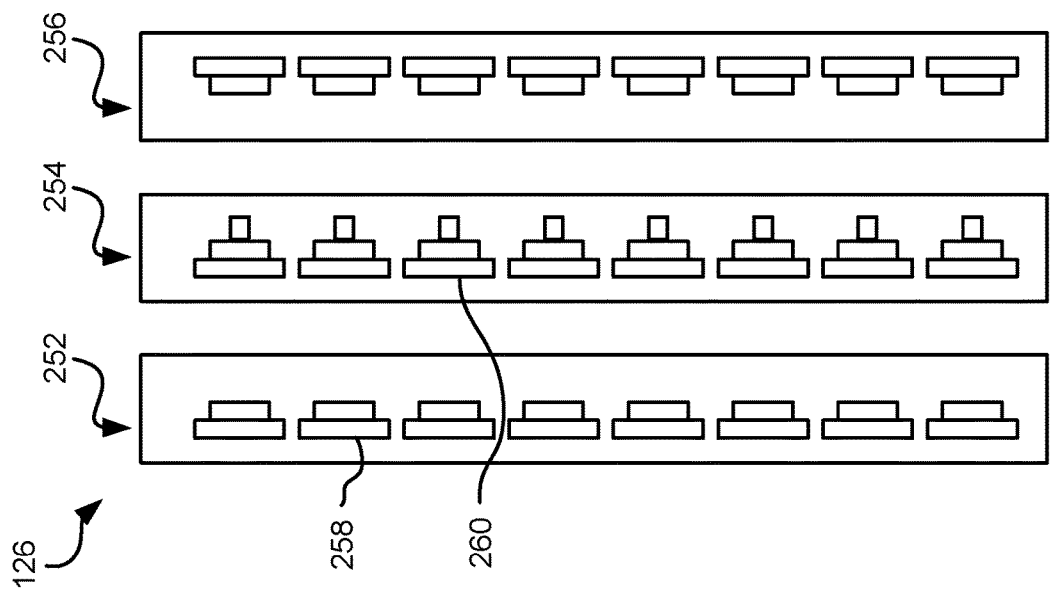
FIG. 4 is a partial tape bearing surface view of a magnetic head having a read-write-read configuration.
Figure 3:
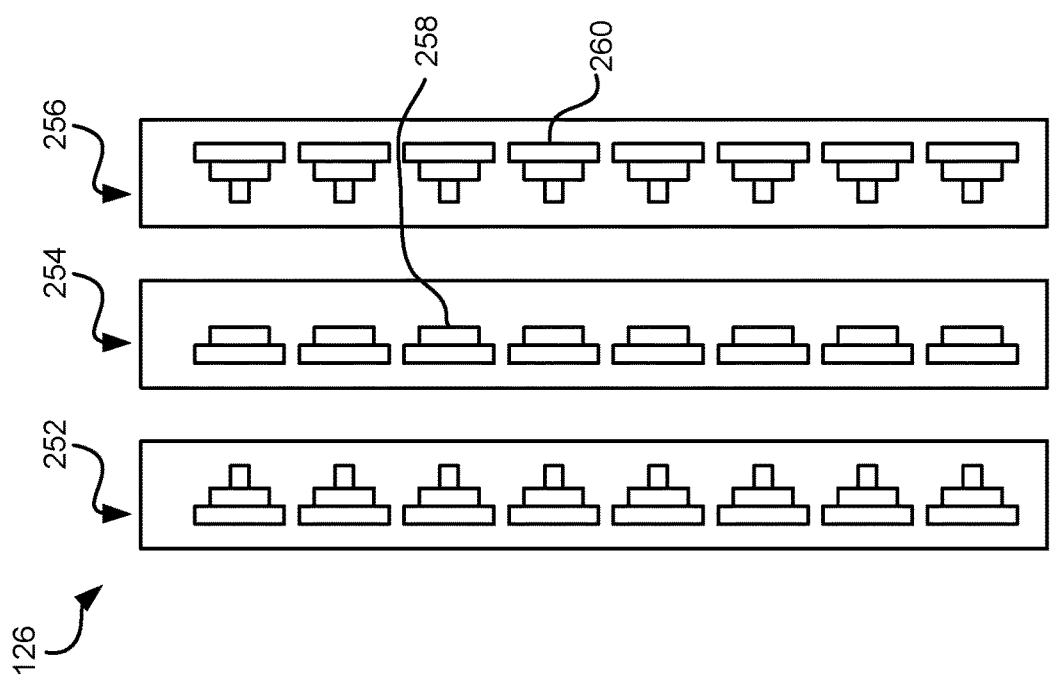
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
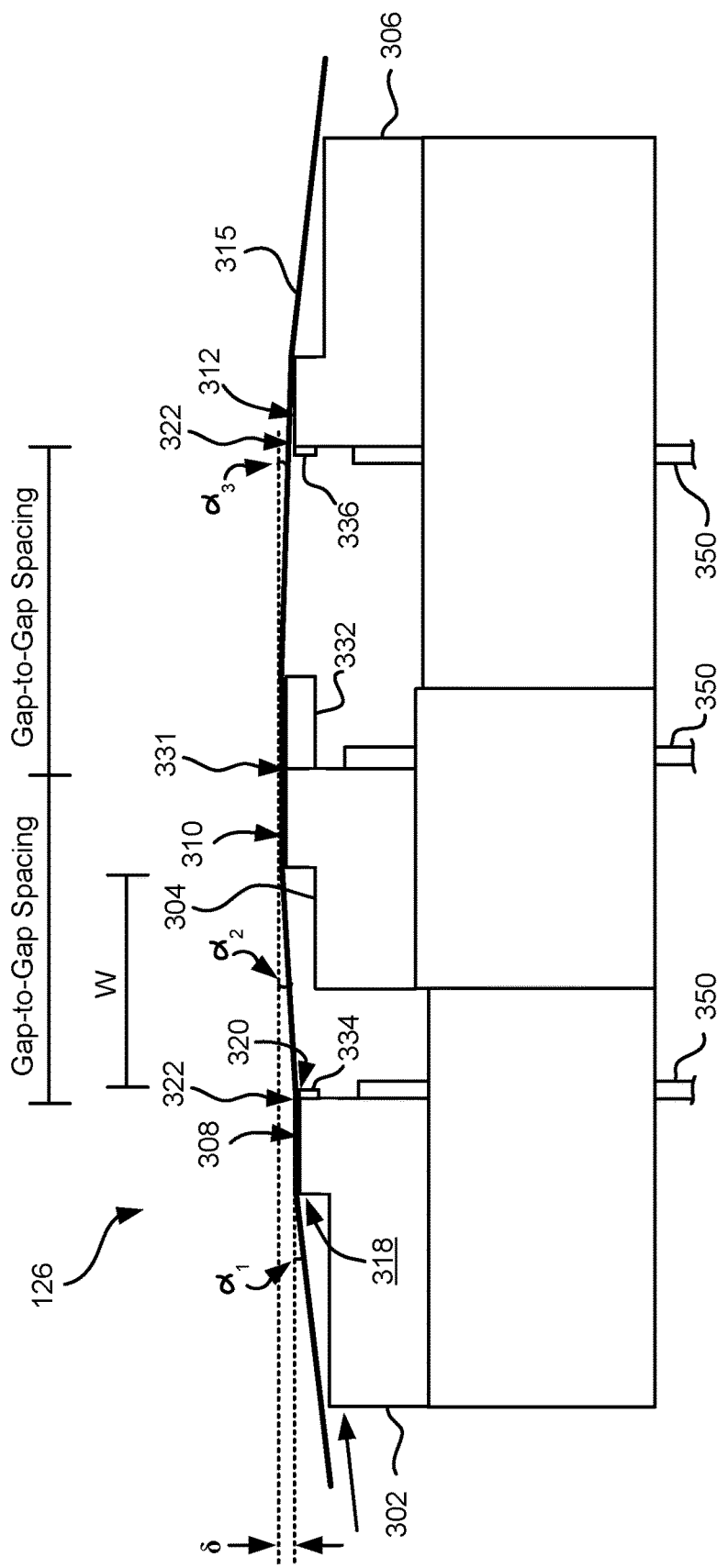
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
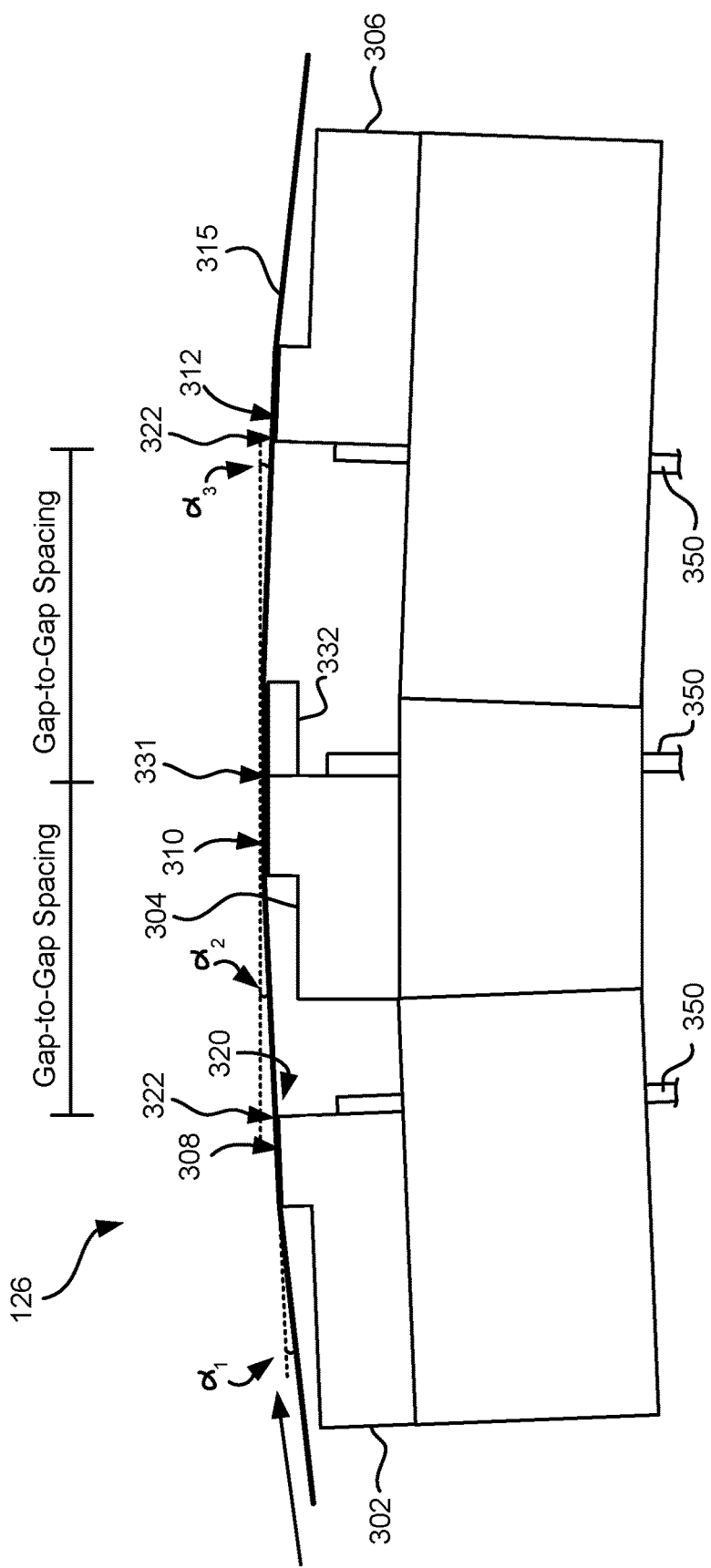
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
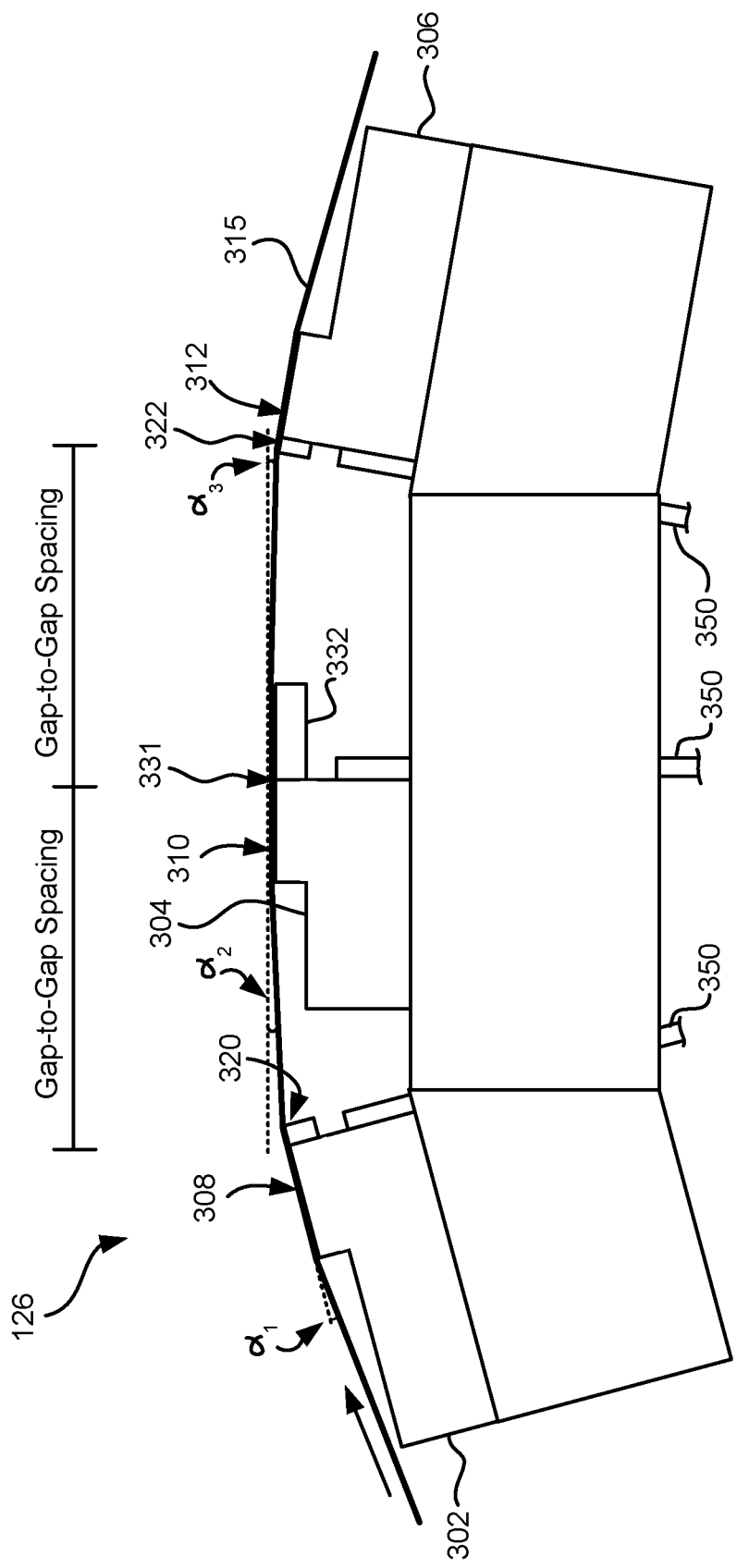
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

With continued reference to the above described apparatuses, it would be advantageous for tape recording heads to include CPP MR sensor technology, such as TMR and GMR. Furthermore, with the continual decrease in data track width in magnetic storage technologies, CPP MR sensors enable readback of data in ultra-thin data tracks due to their high level of sensitivity in such small operating environments.

As will be appreciated by one skilled in the art, by way of example, TMR is a magnetoresistive effect that occurs with a magnetic tunnel junction. TMR sensors typically include two ferromagnetic layers separated by a thin insulating barrier layer. If the barrier layer is thin enough e.g., less than about 15 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

It is well known that TMR and other CPP MR sensors are very susceptible to shorting during fabrication due to abrasive lapping particles that scratch/smear conductive material across the insulating materials separating the conductive leads, e.g., opposing shields, thereby creating a short. Particularly, the lapping particles tend to plow through ductile magnetic material, e.g., from one or both shields, smearing the metal across the insulating material, and thereby creating an electrical short that reduces the effective resistance of the sensor and diminishes the sensitivity of the sensor.

Scientists and engineers familiar with tape recording technology would not expect a CPP MR sensor to remain operable (e.g., by not experiencing shorting) in a contact recording environment such as tape data storage, because of the near certain probability that abrasive asperities embedded in the recording medium will scrape across the thin insulating layer during tape travel, thereby creating the aforementioned shorting.

Typical CPP MR sensors such as TMR sensors in hard disk drive applications are configured to be in electrical contact with the top and bottom shields of read head structures. In such configurations the current flow is constrained to traveling between the top shield and the bottom shield through the sensor, by an insulator layer with a thickness of about 3-100 nanometers (nm). This insulator layer extends below the hard magnet layer to insulate the bottom of the hard magnet from the bottom shield/lead layers, and isolates the edges of the sensor from the hard magnet material. In a tape environment, where the sensor is in contact with the tape media, smearing of the top or bottom shield material can bridge the insulation layer separating the hard magnet from the bottom lead and lower shield, thereby shorting the sensor.

In disk drives, conventional CPP MR designs are acceptable because there is minimal contact between the head and the media. However, for tape recording, the head and the media are in constant contact. Head coating has been cited as a possible solution to these shorting issues; however tape particles and asperities have been known to scratch through and/or wear away these coating materials. Furthermore, conventional magnetic recording head coatings do not protect against defects during lapping processes since the coating is applied after these process steps. Because the insulating layers of a conventional CPP MR sensor are so thin, the propensity for electrical shorting due, e.g., to scratches, material deposits, surface defects, etc. is extremely high. Embodiments described herein implement novel insulative layers on a CPP MR sensor in order to prevent shorting in the most common areas where shorting has been observed, e.g. the relatively larger areas on opposite sides of the sensor between the shields.

Furthermore, the potential use of CPP MR sensors in tape heads has heretofore been thought to be highly undesirable, as tape heads include multiple sensors, e.g., 16, 32, 64, etc., on a single die. If one or more of those sensors become inoperable due to the aforementioned shorting, the head becomes defective and typically would need to be discarded and/or replaced for proper operation of the apparatus.

Conventional current in plane-type sensors require at least two shorting events across different parts of the sensor in order to affect the sensor output, and therefore such heads are far less susceptible to shorting due to scratches. In contrast, tape heads with CPP MR sensors may short with a single event, which is another reason that CPP MR sensors have not been adopted into contact recording systems.

Various embodiments described herein have top and/or bottom shields electrically isolated from a CPP MR sensor, thereby eliminate the problem of shield-to-shield shorting rendering the sensor diminished and/or inoperative.

Figure 8A:
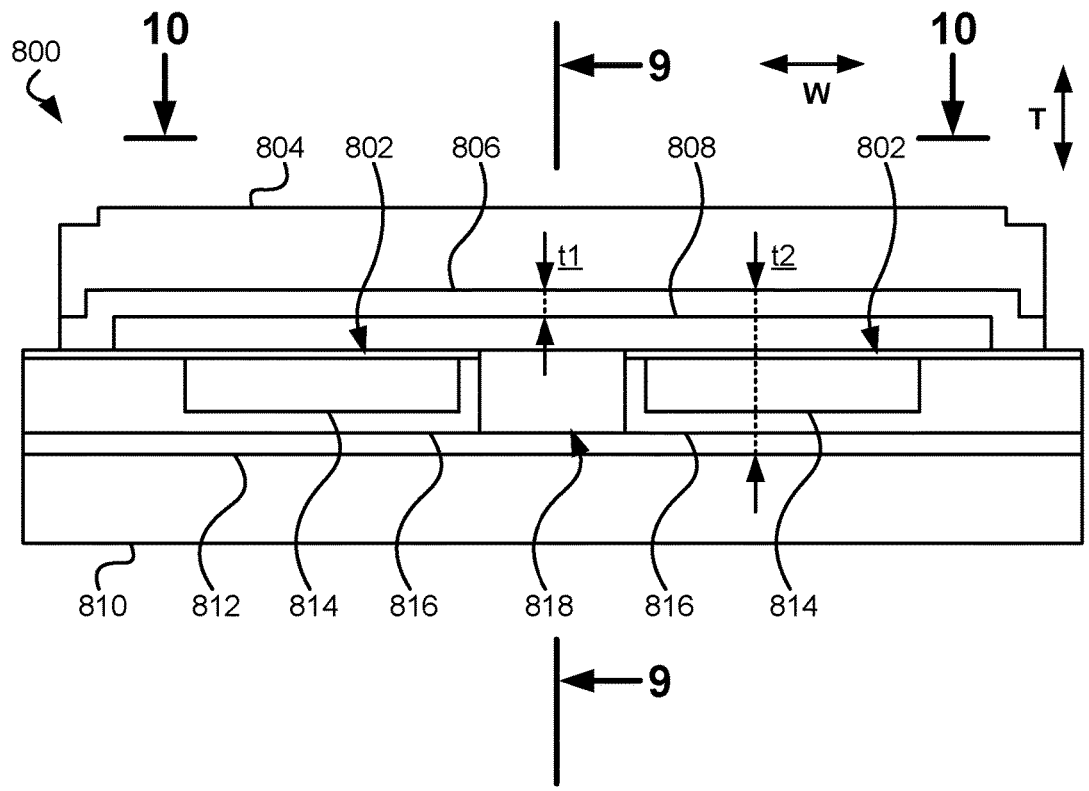
FIG. 8A is a side view of a media facing side of a transducer structure according to one embodiment.

FIG. 8A depicts a transducer structure 800 in accordance with one embodiment. As an option, the present transducer structure 800 may be implemented in conjunction with features from any other embodiment listed herein, such as those described with reference to the other FIGS. Of course, however, such transducer structure 800 and others presented herein may be used in various applications and/or in permutations which may or may not be specifically described in the illustrative embodiments listed herein. Further, the transducer structure 800 presented herein may be used in any desired environment.

Referring now to FIG. 8A, transducer structure 800 includes a lower shield 810 and an upper shield 804 above the lower shield 810, the shields providing magnetic shielding. Transducer structure 800 further includes a CPP MR, e.g. such as a TMR sensor, GMR sensor, etc. Between the upper and lower shields 804, 810, transducer structure 800 includes sensor stack 818. An upper electrical lead 808 is positioned between the sensor stack 818 and the upper shield 804. Additionally, transducer structure 800 includes a hard bias layer 814 and a hard bias insulating layer 816. The hard bias insulating layer 816 insulates the sensor stack 818 from the hard bias layer 814. The sensor stack 818 and the hard bias layer 814 are separated by a hard bias insulating layer 816 width in the width direction W of about 3-100 nm. The hard bias insulating layer 816 additionally extends below the hard bias layer 814 to insulate the bottom of the hard bias layer 814 from the top of the lower electrode, which may be the lower shield 810 as in FIG. 8B, and/or an optional lower lead 812 as in FIG. 8A.

As briefly described above, the lower electrical lead 812 is positioned between the sensor stack 818 and the lower shield 810. The upper electrical lead 808 and lower electrical lead 812 are in electrical communication with the sensor stack 818. Note that the transducer structure 800 and additional transducer structures described herein may include more than one upper and/or lower electrical leads, depending on the embodiment. An insulating layer 806 is positioned between the upper electrical lead 808 and the shield closest thereto e.g. the upper shield 804.

In embodiments described herein, an insulating layer e.g. insulating layer 806 is positioned between e.g. at least one of the leads, any of the leads, all of the leads, etc. and the shield closest to the respective lead thereto, such that the at least one lead is electrically isolated from the shield closest thereto. Insulating layer 806 may be constructed of any suitable electrically insulating material, such as alumina, alumina oxide, $SiO_2$, $TaO_2$, $Si_3N_4$, etc., depending on the embodiment.

Some embodiments described herein include an optional insulating layer 802 as shown e.g. in FIGS. 8A and 9-12. The optional insulating layer 802 is illustrated as being positioned below the upper electrical lead 808, sandwiched between the upper electrical lead 808 and the nearest hard bias layer 814. However, the position of the insulating layer 802 may vary depending on the preferred embodiment.

As described above, it is not uncommon for tape asperities passing over the sensor to smear the material of an upper or lower shield onto the opposite shield, thereby potentially shorting the sensor. Insulating layer 806 reduces the probability of smear in the sensor region particularly by increasing the spacing between the upper and lower shield 804, 810. Moreover, because the upper lead 808 is isolated from the upper shield 804 by the insulating layer 806, and preferably has a width that is less than the width of the upper shield 804, the probability of a smear bridging the upper and lower leads 808, 812 is minimized.

The shield to shield spacing t2 is selected based on the linear recording density of the format, and therefore generally cannot simply be made larger to prevent shorting. Moreover, it would be desirable to maximize the thickness of the insulating layer 806 while minimizing the thickness of the upper lead 808; however, the lead cannot be too thin as this would raise head resistance and hurt sensitivity. Accordingly, a balance between layer thicknesses within the constraint of the spacing t2 is desirable. Insulating layer 806 preferably has a thickness t1 of about 5-25 nanometers, but could be greater or less in other embodiments. Due to the insertion of the insulating material within the shield to shield spacing t2, the probability of a smearing event from plowing material of one shield to the other shield in a thickness direction T (which would ultimately short the sensor) is decreased. Direction T may also be herein referred to as the intended direction of tape travel.

Figure 12:
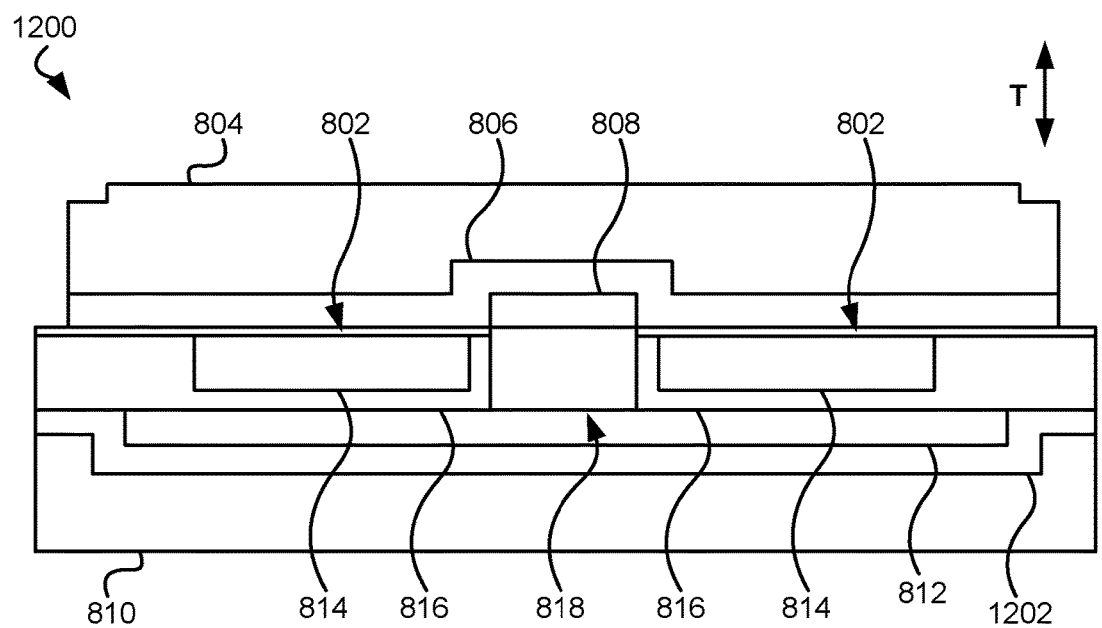
FIG. 12 is a side view of a media facing side of a transducer structure according to one embodiment.

Although not illustrated in transducer structure 800, according to various embodiments, a lower insulating layer may be present between the lower shield 810 and the lower lead 812 (as will be further described in FIG. 12). For example, one embodiment may have a lower lead and a lower insulating layer therebelow, while the upper lead 808 is electrically coupled to the upper shield 804, e.g., insulating layer 806 is not present. In embodiments having both upper and lower insulating layers, the probability of a smearing event from plowing material of one shield to the other shield in direction T (which would ultimately short the sensor) is decreased even further.

The upper lead 808 and the lower lead 812 are preferably constructed of any suitable conductive material e.g., Jr, Ru, NiCr, Ta, Cr, etc., may be a laminated structure of Ta e.g. Ta/X/Ta, etc. Furthermore, the compositions of the upper lead 808 and the lower lead 812 may be the same or different, and may vary depending on the embodiment.

Figure 8B:
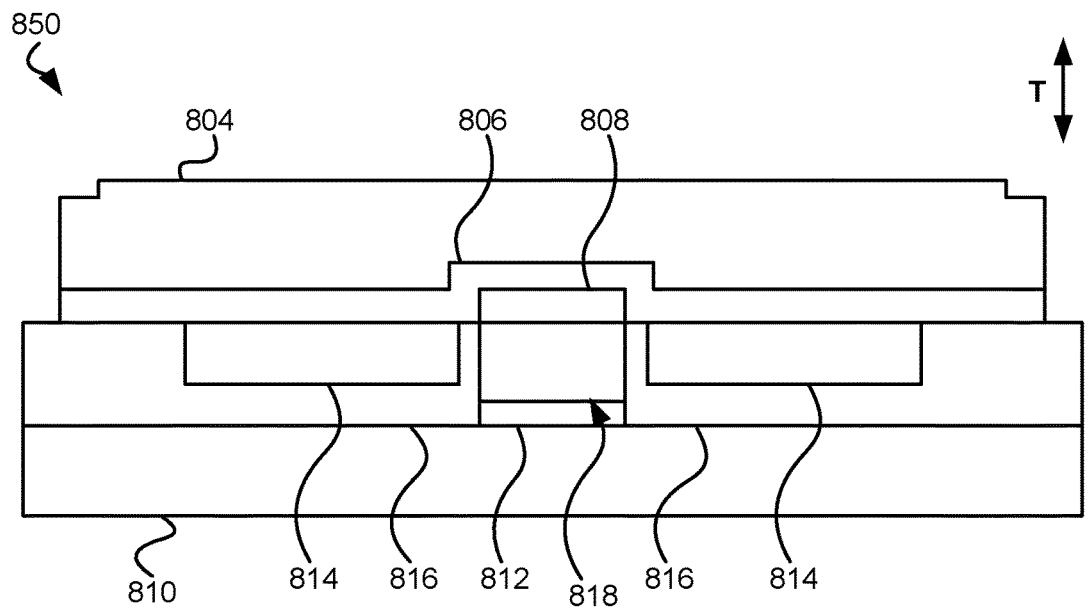
FIG. 8B is a side view of a media facing side of a transducer structure according to another embodiment.

According to one embodiment, as illustrated in FIG. 8B, the upper and/or lower leads 808, 812 may have a width that is about equal to the width of the sensor stack 818, and in other embodiments up to about 300% wider than the width of the sensor stack 818. According to another embodiment (e.g. see FIGS. 8A, 9, 11 and 12, etc.) the upper and/or lower lead 808, 812 may have a width that is substantially greater than the width of the sensor stack 818. Furthermore, the upper and lower leads 808, 812 may have different thicknesses or the same thicknesses, depending on e.g. the embodiment, system constraints, etc.

Figure 9:
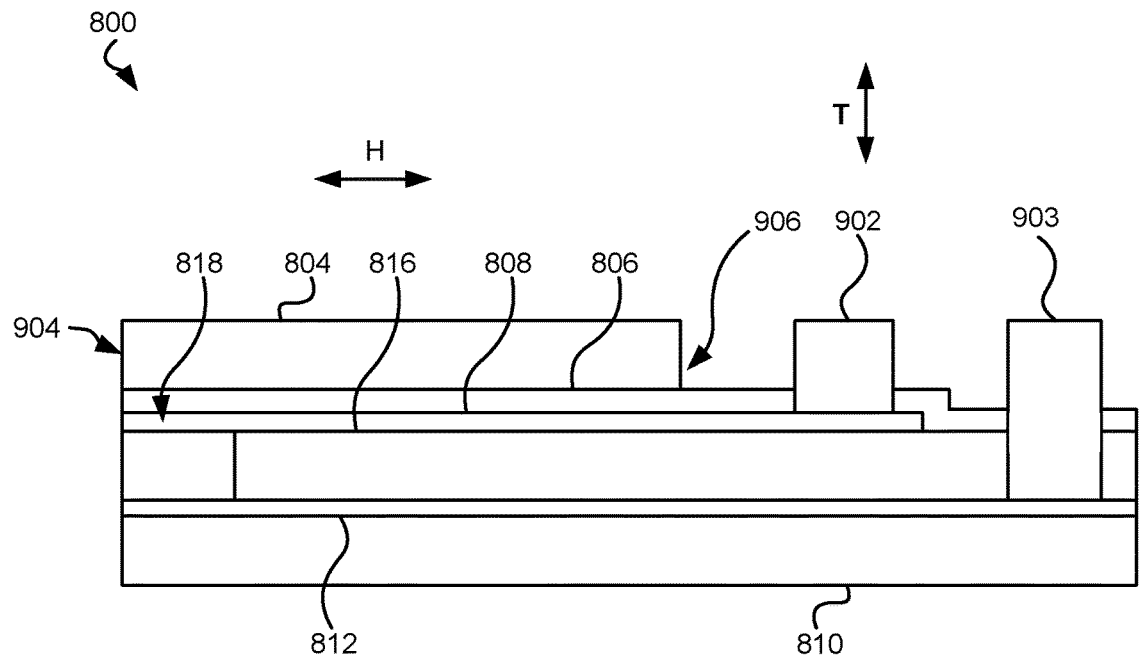
FIG. 9 is a cross sectional view of the transducer structure of FIG. 8A taken along line 9-9 of FIG. 8A.

Referring now to FIG. 9, there is shown a cross sectional view of transducer structure 800 of FIG. 8A, including electrical vias 902, 903 (not shown in FIG. 8A). As illustrated in FIG. 9 the electrical vias 902, 903 are positioned behind the upper shield 804, relative to the media facing side 904 of the upper shield 804 in the height direction H. Additionally, electrical vias 902, 903 are each in electrical communication with one of the leads e.g. upper lead 808 (as shown in FIG. 9) and lower lead 812, respectively. As depicted, the electrical via 902 is isolated from the shield, e.g. upper shield 804, closest thereto. Electrical via 903 is electrically isolated from upper lead 808 and is in electrical communication with the lower lead 812. In order for the electrical via 902 to be in electrical communication with the upper lead 808 (as shown in FIG. 9), the upper lead 808 extends past the back edge 906 of the upper shield 804. The electrical vias 902, 903 may extend to pads on the head, which may ultimately be coupleable to a cable for communication with drive circuitry.

It should be noted that 'lower' and 'upper' implemented in descriptions herein generally correspond to order of fabrication, e.g. a lower shield 810 being formed before a corresponding upper shield 804, etc. Methods of fabrication and manufacture will be described below.

Figure 10:
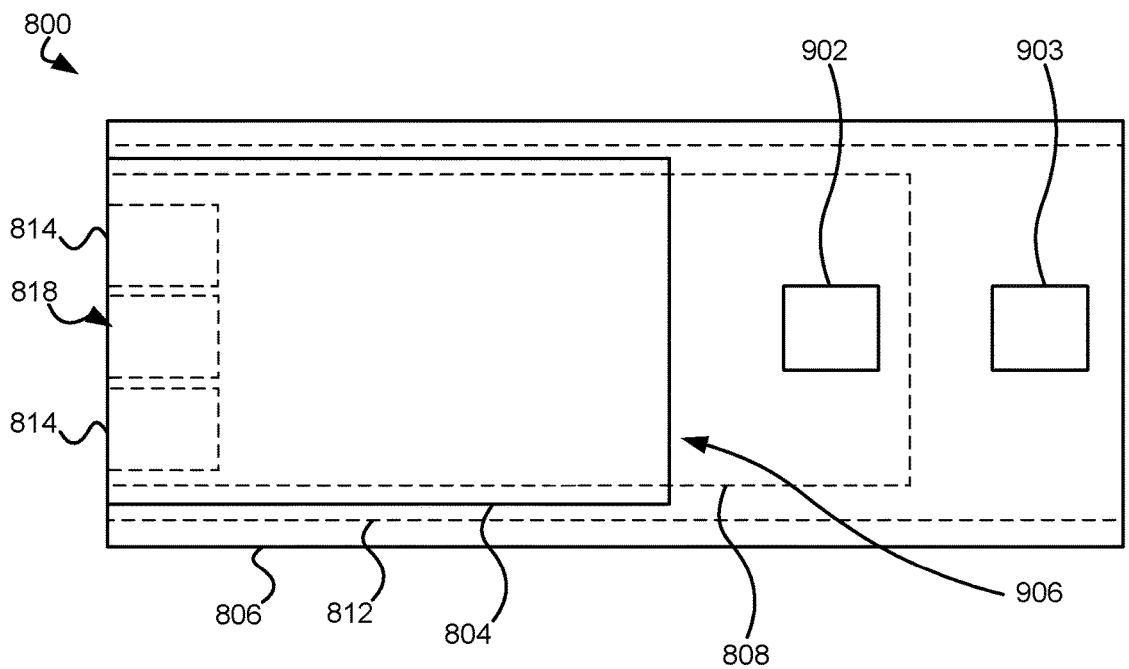
FIG. 10 is a top down view of the transducer structure of FIG. 8A taken along line 10-10 of FIG. 8A.

FIG. 10 illustrates a top down view of the transducer structure 800 of FIG. 8A. As was described in FIG. 9, the upper lead 808 in FIG. 10 is seen extending past the back edge 906 of the upper shield 804 and is in electrical communication with electrical via 902.

Figure 11:
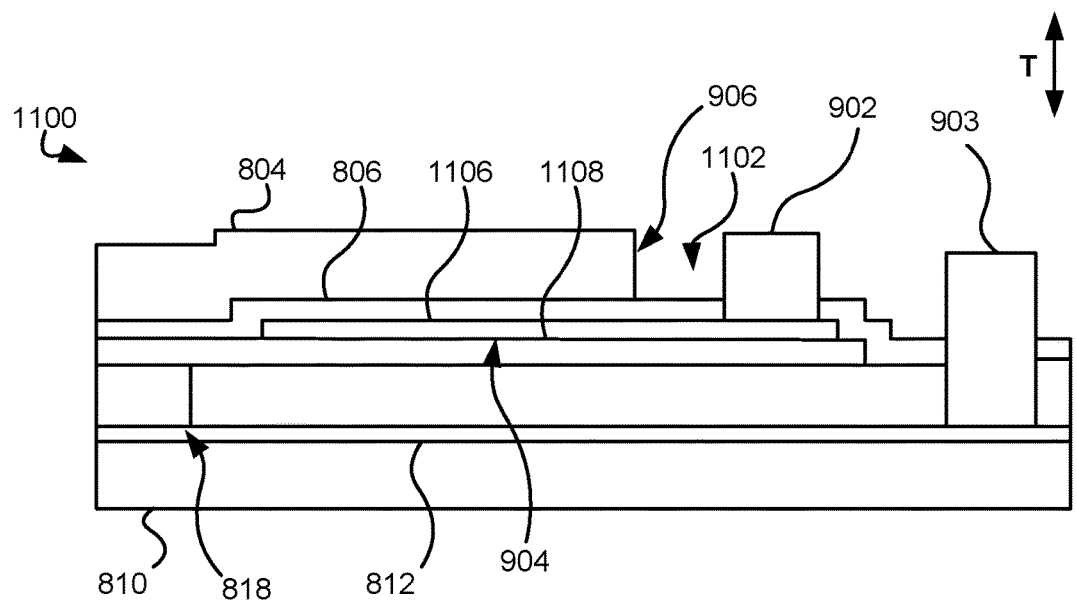
FIG. 11 is a cross sectional view of a transducer structure according to one embodiment.

FIG. 11, which may otherwise have similar components as other embodiments herein, includes a transducer structure 1100 where one of the leads e.g. stitched lead 1102 isolated from the shield closest thereto e.g. upper shield 804, includes a main layer 1108 and a stitch layer 1106. By stitching a second layer of lead material e.g. stitch layer 1106, that is recessed past the back edge 906 of the sensor stack 818, the resistance associated with the routing of the upper lead 808 past the back edge of the upper shield 804 is reduced. Additionally, the stitch layer 1106 is recessed from a media facing side 904 of the main layer 1108. The stitched lead 1102 may be constructed of any suitable conductive material, such as Jr, Cu, Ru, Pt, NiCr, Au, Ag, Ta, Cr, etc.; may be a sandwich structure of Ta e.g. Ta/X/Ta; etc.

The stitched lead configuration of transducer structure 1100 desirably reduces the resistance associated with the routing of the upper lead 808 past the back edge 906 of the upper shield 804. For example, in an embodiment where Ru is used as the top lead material, the resistivity "p" would be about 7.1 micro-ohms/cm. A single lead with thickness of 30 nm would have a sheet resistivity (p/thickness) equal to about 2.3 ohms/square. This implies that if the top lead design had 6 "squares" of lead geometry, the lead resistance would be about 13.8 ohms. However, by implementing a stitched lead 1102 above the top lead, the total lead resistance would be significantly reduced. For example, consider a stitched lead of Ru with a thickness of 45 nm covering 5 of the 6 "squares" of the lead geometry. The lead region where the stitched structure and the initial lead overlay has a net thickness of about 75 nm and a sheet resistivity equal to 0.95 ohms/square. Implementing a stitched lead 1102 as described above would reduce the lead resistance to 7.3 ohms or by about 45%. Embodiments described herein may or may not implement the stitched lead 1102, depending on the preferred embodiment.

FIG. 12 depicts transducer structure 1200 in accordance with one embodiment. As an option, the present transducer structure 1200 may be implemented in conjunction with features from any other embodiment listed herein, such as those described with reference to the other FIGS. Of course, however, such transducer structure 1200 and others presented herein may be used in various applications and/or in permutations which may or may not be specifically described in the illustrative embodiments listed herein. Further, the transducer structure 1200 presented herein may be used in any desired environment.

Transducer structure 1200 includes a similar transducer structure to e.g. transducer structure 850 (and 800), with a few differences. For example, transducer structure additionally includes a lower insulating layer 1202, which is positioned between the lower lead 812 and the lower shield 810, such that the lower lead 812 is electrically isolated from the shield closest thereto e.g. lower shield 810. Sensor stack 818 is electrically isolated in transducer structure 1200 from the upper shield 804 and the lower shield 810 by the insulating layer 806 and the lower insulating layer 1202, respectively. Furthermore, the lower lead 812 is illustrated as being wider than the sensor stack 818, but as described above, according to preferred embodiments the lower lead 812 width may have a similar width as the sensor stack 818. Similarly, the upper lead 808 is illustrated as having a width about equal to the sensor stack 818 width, but according to other embodiments, the upper lead 808 may have a width that is greater than the sensor 818 width.

Lower insulating layer 1202 may be constructed of any suitable insulating material, such as alumina, alumina oxide, $SiO_2$, $TaO_2$, $Si_3N_4$, etc. Transducer structure thickness ranges will now be described below.

The read gap of transducer structure 1200 includes the lower lead 812, the lower insulating layer 1202 (for transducer structure 1200), the sensor stack 818, the upper lead 808, and the upper insulating layer 806. In order to reduce the lower lead 812 resistance, a partial majority of the read gap thickness is allocated to the lower lead 812, and thus the lower lead 812 thickness can range from about 5-35 nm and the lower insulating layer 1202 can range from about 5-25 nm, but either range could be higher or lower. Furthermore, the sensor stack 818 typically has a thickness in direction T of about 45 nm. In order to reduce the upper lead 808 resistance, a partial majority of the read gap thickness is allocated to the upper lead 808, and thus the upper lead 808 thickness can range from about 5-35 nm and the upper insulating layer 806 can range from about 5-25 nm, but could be higher or lower.

According to the above described transducer layer thicknesses, transducer structures with an upper insulating layer 806 and no lower insulating layer 1202 (e.g. transducer structures 800, 850, 1100, etc.) may have a read gap thickness (shield to shield spacing) t2 in direction T of about 85-125 nm, but could be higher or lower. Thicknesses described above are measured in the tape travel direction T, and may vary depending on the linear density of the recording format.

A method of manufacture of the above described transducer structures will now be described below. The implementation of upper insulating layer 806, and depending on the embodiment, the lower insulating layer 1202 decreases the probability of a smearing event from plowing material of a shield across multiple leads in a direction T (which would ultimately short the sensor).

Figure 13:
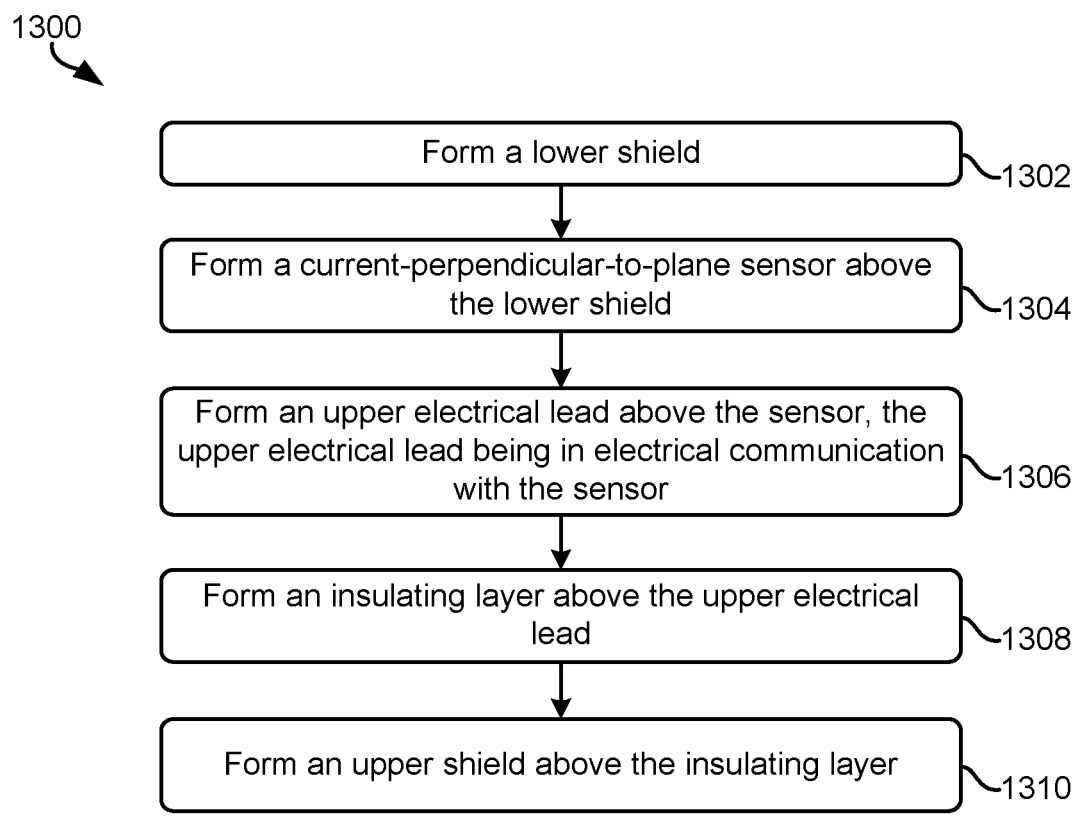
FIG. 13 is a diagram of a method according to one embodiment.

FIG. 13 depicts method 1300 in accordance with one embodiment. As an option, the present method 1300 may be implemented in conjunction with features from any other embodiment listed herein, such as those described with reference to the other FIGS. Of course, however, such method 1300 and others presented herein may be used in various applications and/or in permutations which may or may not be specifically described in the illustrative embodiments listed herein. Further, the method 1300 presented herein may be used in any desired environment.

Referring now to method 1300, operations 1302, 1304, 1306, 1308, and 1310 describe a method of manufacture of embodiments e.g. transducer structures, etc. described herein. Operation 1302 of method 1300 includes forming a lower shield (e.g. lower shield 810 of FIGS. 8A-12), etc. Operation 1304 includes forming a current-perpendicular-to-plane sensor e.g. such as a TMR sensor above the lower shield 810.

With continued reference to method 1300, operation 1306 includes forming an upper electrical lead above the sensor (e.g. see 808 of FIGS. 8A-12), where the upper electrical lead is in electrical communication with the sensor. Operation 1308 includes forming an insulating layer above the upper electrical lead. Additionally, operation 1310 includes forming an upper shield above the insulating layer.

Various embodiments may be fabricated using known manufacturing techniques. Conventional materials may be used for the various layers unless otherwise specifically foreclosed. Furthermore, as described above, deposition thicknesses, configurations, etc. may vary depending on the embodiment.

It should be noted that although FIGS. 8A-12 each illustrate a single transducer structure (transducer structures 800, 850, 1100, 1200), various embodiments described herein include at least eight of the transducer structures above a common substrate, e.g., as shown in FIG. 2B. Furthermore, the number of transducer structures in a given array may vary depending on the preferred embodiment.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
 an array of transducer structures arranged along a tape bearing surface of a common module, each transducer structure having:
  a lower shield;
  an upper shield above the lower shield;
  a current-perpendicular-to-plane sensor between the upper and lower shields;
  an upper electrical lead between the sensor and the upper shield and a lower electrical lead between the sensor and the lower shield, the leads being in electrical communication with the sensor; and
  an insulating layer between the at least one of the leads and the shield closest thereto,
  wherein a width of each lead in a cross track direction is about equal to a width of the sensor,
  wherein the lower electrical lead is in electrical communication with the lower shield and the sensor.

2. An apparatus as recited in claim 1, wherein the insulating layer is present between the upper shield and the upper electrical lead.

3. An apparatus as recited in claim 1, wherein the insulating layer is present between the lower shield and the lower electrical lead.

4. An apparatus as recited in claim 1, wherein the insulating layer is present between the upper shield and the upper electrical lead, wherein the insulating layer is present between the lower shield and the lower electrical lead.

5. An apparatus as recited in claim 1, wherein, for each transducer structure, one of the leads isolated from the shield closest thereto includes a main layer and a stitch layer thereon, the stitch layer being recessed from a media facing side of the main layer.

6. An apparatus as recited in claim 1, comprising, in each transducer structure, an electrical via positioned behind the upper shield relative to a media facing side of the upper shield, the electrical via being in electrical communication with one of the leads isolated from the shield closest thereto.

7. An apparatus as recited in claim 1, comprising an insulating layer sandwiched between the upper electrical lead and a hard bias layer.

8. An apparatus as recited in claim 1, wherein each sensor is a tunneling magnetoresistive sensor.

9. An apparatus as recited in claim 8, wherein at least eight of the transducer structures are present above a common substrate.

10. An apparatus as recited in claim 9, comprising:
 a drive mechanism for passing a magnetic medium over the sensors; and
 a controller electrically coupled to the sensor.

11. An apparatus as recited in claim 10, wherein the magnetic medium is a magnetic recording tape, and comprising, in each transducer structure, an electrical via positioned behind the upper shield relative to a media facing side of the upper shield, the electrical via being in electrical communication with one of the leads isolated from the shield closest thereto.

12. An apparatus, comprising:
 an array of transducer structures arranged along a tape bearing surface of a common module, each transducer structure having:
  a lower shield;
  an upper shield above the lower shield;
  a current-perpendicular-to-plane sensor between the upper and lower shields;
  an upper electrical lead between the sensor and the upper shield, the upper electrical lead being in electrical communication with the sensor;
  an insulating layer between the upper electrical lead and the upper shield; and
  a lower electrical lead between each lower shield and the associated sensor, wherein each lower electrical lead is in electrical communication with the associated lower shield and the associated sensor,
  wherein a width of the upper electrical lead in a cross track direction is about equal to a width of the sensor.

13. An apparatus as recited in claim 12, comprising an electrical via in each transducer structure, the electrical via being positioned behind the upper shield relative to a media facing side of the upper shield, the electrical via being in electrical communication with the upper electrical lead, wherein a width of the lower electrical lead in the cross track direction is greater than the width of the sensor.

14. An apparatus as recited in claim 12, comprising:
 a drive mechanism for passing a magnetic medium over the sensors; and
 a controller electrically coupled to the sensors.

15. An apparatus as recited in claim 14, wherein the magnetic medium is a magnetic recording tape.

16. An apparatus as recited in claim 12, wherein each sensor is a tunneling magnetoresistive sensor, wherein at least eight of the transducer structures are present above a common substrate.

17. A method of forming a plurality of magnetic head modules each having an array of read transducer structures, the method comprising:
- forming a lower shield for each of the read transducer structures;
- forming a current-perpendicular-to-plane sensor above each lower shield;
- forming a lower electrical lead between each lower shield and the associated sensor;
- forming an upper electrical lead above each sensor, each upper electrical lead being in electrical communication with the associated sensor;
- forming an insulating layer above each upper electrical lead; and
- forming an upper shield above each insulating layer,
- wherein each upper electrical lead includes a main layer and a stitch layer thereon, the stitch layer being recessed from a media facing side of the main layer,
- wherein a width of each lower electrical lead in a cross track direction is greater than a width of the associated sensor,
- wherein a width of each upper electrical lead in a cross track direction is about equal to a width of the sensor.

18. A method as recited in claim 17, wherein each sensor is a tunneling magnetoresistive sensor.

\* \* \* \* \*